United States Patent
Balachandran et al.

(10) Patent No.: US 12,134,394 B2
(45) Date of Patent: Nov. 5, 2024

(54) VEHICLE DYNAMICS EMULATION

(71) Applicant: Toyota Research Institute, Inc., Los Altos, CA (US)

(72) Inventors: Avinash Balachandran, Sunnyvale, CA (US); Yan Ming Jonathan Goh, Palo Alto, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 578 days.

(21) Appl. No.: 16/989,330

(22) Filed: Aug. 10, 2020

(65) Prior Publication Data
US 2022/0041176 A1 Feb. 10, 2022

(51) Int. Cl.
*B60W 50/08* (2020.01)
*B60W 10/04* (2006.01)
(Continued)

(52) U.S. Cl.
CPC .......... *B60W 50/087* (2013.01); *B60W 10/04* (2013.01); *B60W 10/18* (2013.01);
(Continued)

(58) Field of Classification Search
CPC .... B60W 50/087; B60W 10/04; B60W 10/18; B60W 10/20; B60W 10/22;
(Continued)

(56) References Cited

U.S. PATENT DOCUMENTS 6,131,688 A 10/2000 Fukada
11,216,887 B1 * 1/2022 Carbery ................. G06Q 40/08
(Continued)

FOREIGN PATENT DOCUMENTS

CN 203281031 U * 11/2013 ............. A63H 17/39
DE 10338706 A1 3/2004

OTHER PUBLICATIONS

Boyuan Li, Haiping Du, Weihua Li, Yongjun Zhang, "Side-slip angle estimation based lateral dynamics control for omni-directional vehicles with optimal steering angle and traction/brake torque distribution" Mechatronics, vol. 30, 2015, pp. 348-362 (Year: 2015).*

(Continued)

*Primary Examiner* — Russell Frejd
*Assistant Examiner* — Brittany Renee Peko
(74) *Attorney, Agent, or Firm* — Christopher G. Darrow; Darrow Mustafa PC

(57) ABSTRACT

System, methods, and other embodiments described herein relate to emulating vehicle dynamics. In one embodiment, a method for emulating vehicle dynamics in a vehicle having a plurality of wheels and equipped with all-wheel steering, includes receiving emulation settings that indicate one or more environment parameters and/or vehicle parameters, detecting driver inputs including at least steering input and throttle input, executing a simulation model that receives the driver inputs and emulation settings, simulates the vehicle operating based on the driver inputs and the emulation settings, and outputs one or more simulated states of the vehicle based on the simulated operation of the vehicle, determining one or more actuation commands for each wheel of the vehicle to cause the vehicle to emulate the one or more simulated states, and executing the one or more actuation commands, wherein the actuation commands include at least wheel angle commands and torque commands.

18 Claims, 7 Drawing Sheets

(51) Int. Cl.
*B60W 10/18* (2012.01)
*B60W 10/20* (2006.01)
*B60W 10/22* (2006.01)
*B62D 7/14* (2006.01)

(52) U.S. Cl.
CPC ............ *B60W 10/20* (2013.01); *B60W 10/22* (2013.01); *B62D 7/14* (2013.01); *B60W 2520/10* (2013.01); *B60W 2520/12* (2013.01); *B60W 2520/14* (2013.01); *B60W 2520/20* (2013.01); *B60W 2530/10* (2013.01); *B60W 2530/20* (2013.01); *B60W 2530/201* (2020.02); *B60W 2540/10* (2013.01); *B60W 2540/18* (2013.01); *B60W 2552/40* (2020.02); *B60W 2555/20* (2020.02); *B60W 2710/18* (2013.01); *B60W 2710/20* (2013.01); *B60W 2710/22* (2013.01)

(58) Field of Classification Search
CPC ....... B60W 2530/201; B60W 2552/40; B60W 2555/20; B60W 2520/10; B62D 7/14
See application file for complete search history.

(56) References Cited

U.S. PATENT DOCUMENTS

| | | | | |
|---|---|---|---|---|
| 2006/0273657 | A1* | 12/2006 | Wanke | B60T 8/24 303/146 |
| 2012/0226417 | A1 | 9/2012 | Nishikawa | |
| 2013/0261898 | A1* | 10/2013 | Fujita | B62D 6/00 701/42 |
| 2014/0145498 | A1* | 5/2014 | Yamakado | B60W 30/045 |
| 2016/0332084 | A1 | 11/2016 | McVeen et al. | |
| 2018/0204478 | A1* | 6/2018 | Banga | G09B 9/052 |
| 2019/0318051 | A1* | 10/2019 | Oswald | G06F 17/5009 |
| 2020/0398844 | A1* | 12/2020 | Ruybal | B60W 30/18063 |
| 2021/0214001 | A1* | 7/2021 | Solomon | B62D 6/007 |
| 2022/0212677 | A1* | 7/2022 | Zheng | B60W 40/09 |

OTHER PUBLICATIONS

S. J. Hallowell and L. R. Ray, "All-wheel driving using independent torque control of each wheel," Proceedings of the 2003 American Control Conference, 2003., Denver, CO, USA, 2003, pp. 2590-2595 vol. 3, (Year: 2003).*

J. Ni, J. Hu and C. Xiang, "Envelope Control for Four-Wheel Independently Actuated Autonomous Ground Vehicle Through AFS/DYC Integrated Control," in IEEE Transactions on Vehicular Technology, vol. 66, No. 11, pp. 9712-9726, Nov. 2017, doi: 10.1109/TVT.2017.2723418. (Year: 2017).*

Beal, Craig Earl, and J. Christian Gerdes. "Model predictive control for vehicle stabilization at the limits of handling." IEEE Transactions on Control Systems Technology 21.4 (2012): 1258-1269. (Year: 2012).*

Oh, Kwangseok & Yi, Kyongsu. (2014). A predictive driver model with physical constraints for closed loop simulation of vehicle-driver system. 2014 17th IEEE International Conference on Intelligent Transportation Systems, ITSC 2014. 3126-3131. 10.1109/ITSC.2014.6958193. (Year: 2014).*

Takita et al., "High-Speed driving of Lateral Guided Robotic Vehicle with a Rear Wheel Steer Mechanism Controlled by SSM," Engineering Letter, 20 (1), 8 pages (2012).

Zubov et al., "Autonomous Drifting Control in 3D Car Racing Simulator," 2018 International Conference on Intelligent Systems (IS), 7 pages.

Russell et al., "Low Friction Emulation of Lateral Vehicle Dynamics Using Four-Wheel Steer-by-Wire," 2014 American Control Conference, 6 pages (2014).

Goh, "Automated Vehicle Control Beyond the Stability Limits," Stanford University, Dissertation by Johnathan Yan Ming Goh, 170 pages (2019).

* cited by examiner

VEHICLE DYNAMICS EMULATION

TECHNICAL FIELD

The subject matter described herein relates, in general, to systems and methods for emulating vehicle maneuvers, and, more particularly, to a vehicle that can emulate the feel of a drift state for a driver without actually entering a drift state.

BACKGROUND

Vehicle drifting is a driving technique in which a driver intentionally oversteers to an extent that results in a loss of traction between the wheels and the ground surface causing the vehicle slip angle to increase while the vehicle is cornering such that the car moves sideways. To safely accomplish intentional drifting and regain control without causing a spinout requires a highly skilled driver. Furthermore, a vehicle intended for drifting often has many modifications to accommodate drifting, and even with modifications drifting can result in damage to the vehicle, such as burning out the tires. Although drifting can be highly entertaining and enjoyable for many drivers, such factors (i.e., high skill, modified vehicle, damaging effects, etc.) make intentional, controlled drifting a difficult and possibly dangerous feat for an average driver in a typical vehicle to accomplish.

SUMMARY

The disclosed systems and methods provide one or more driving modes that can emulate dynamic driving maneuvers, such as drifting, in a vehicle, by using individual actuation commands for each wheel of the vehicle. For example, the vehicle can be equipped with all-wheel steering and other types of actuation controls (e.g., torque, suspension, etc.).

In one embodiment, an emulation system for emulating vehicle dynamics in a vehicle having a plurality of wheels and equipped with at least all-wheel steering, includes one or more sensors to detect driver inputs including at least steering input and throttle input, one or more processors, and a memory, communicably connected to the one or more processors, storing: a simulation module including instructions that when executed by the one or more processors cause the one or more processors to execute a simulated model that receives the driver inputs and emulation settings that indicate one or more environment parameters and/or vehicle parameters, simulate the vehicle operating based on the driver inputs and the emulation settings, and output one or more simulated states of the vehicle based on the simulated operation of the vehicle, and a controller module including instructions that when executed by the one or more processors cause the one or more processors to determine actuation commands for each wheel of the vehicle to cause the vehicle to emulate the one or more simulated states. The actuation commands include at least wheel angle commands and torque commands.

In another embodiment, a method for emulating vehicle dynamics in a vehicle having a plurality of wheels and equipped with all-wheel steering, includes receiving emulation settings that indicate one or more environment parameters and/or vehicle parameters, detecting driver inputs including at least steering input and throttle input, executing a simulation model that receives the driver inputs and emulation settings, simulates the vehicle operating based on the driver inputs and the emulation settings, and outputs one or more simulated states of the vehicle based on the simulated operation of the vehicle, determining one or more actuation commands for each wheel of the vehicle to cause the vehicle to emulate the one or more simulated states, and executing the one or more actuation commands. The actuation commands include at least wheel angle commands and torque commands.

In another embodiment, a non-transitory computer-readable medium for emulating vehicle dynamics in a vehicle having a plurality of wheels and equipped with all-wheel steering, including instructions that, when executed by one or more processors, cause the one or more processors to: receive emulation settings that indicate one or more environment parameters and/or vehicle parameters, detect driver inputs including at least steering input and throttle input, execute a simulation model that receives the driver inputs and emulation settings, simulates the vehicle operating based on the driver inputs and the emulation settings, and outputs one or more simulated states of the vehicle based on the simulated operation of the vehicle, determine one or more actuation commands for each wheel of the vehicle to cause the vehicle to emulate the one or more simulated states and execute the one or more actuation commands. The actuation commands include at least wheel angle commands and torque commands.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
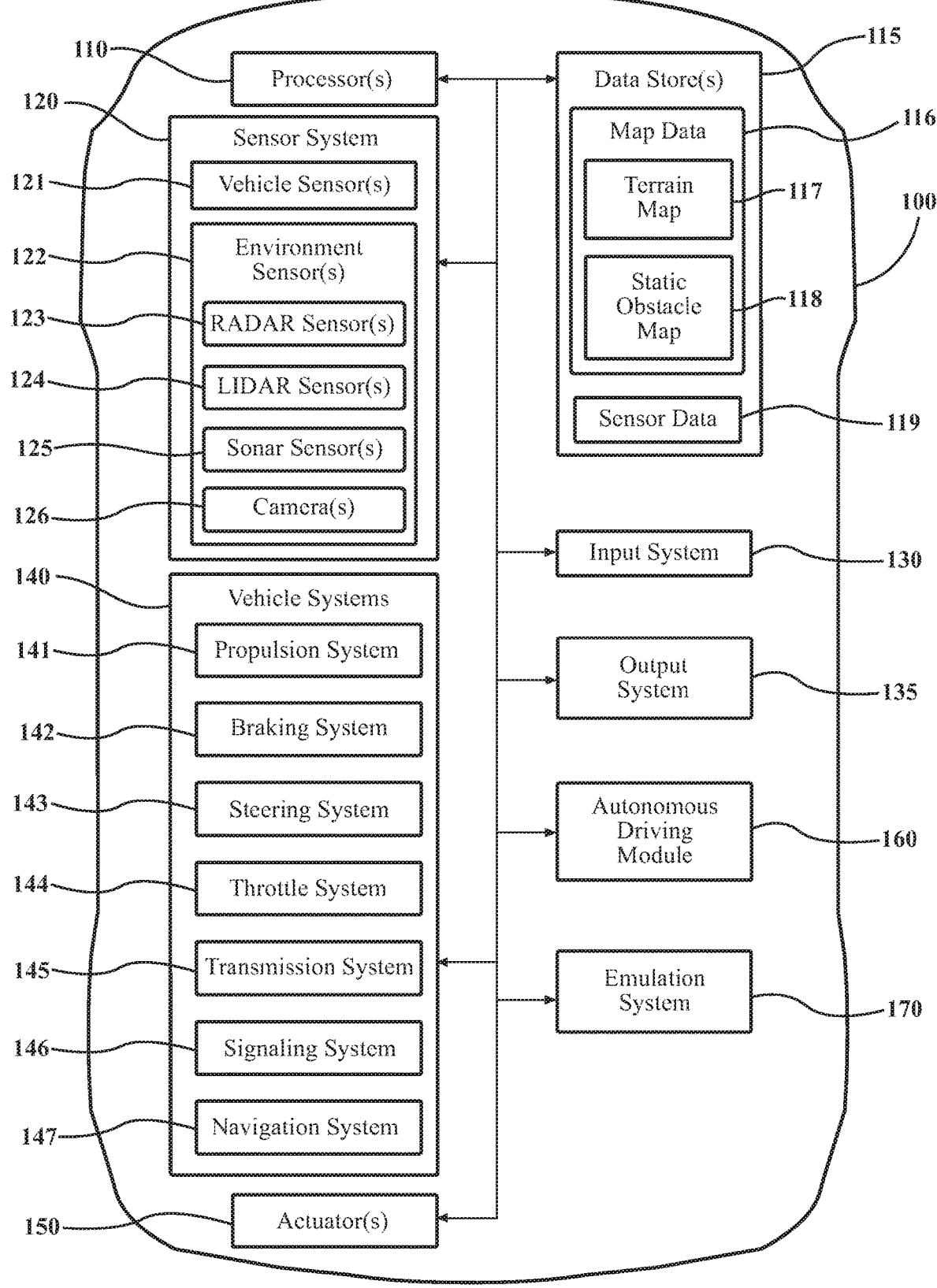
FIG. 1 illustrates one embodiment of a vehicle within which systems and methods disclosed herein may be implemented.

Systems, methods, and embodiments associated with controlling a vehicle to emulate dynamic driving maneuvers, such as drift driving, are disclosed. The disclosed embodiments can utilize one or more systems, such as all-wheel independent steering, steer-by-wire, and individually controlled throttling, braking and suspension to cause a vehicle to emulate or mimic driving states. For example, the disclosed system can emulate a drifting state while not actually losing traction and entering a true drift. Accordingly, a driver can experience the feel and effect of drifting for enjoyment, experimentation, or the like without damaging the vehicle tires and reducing risks that are normally increased inherent to drifting, such as spinning out due to loss of control.

For the purposes of simplicity the present disclosure will focus primarily on manual, four-wheeled vehicles, however the disclosed subject matter is not limited thereto. The disclosed embodiments can be implemented, for example, in any vehicle that has three or more wheels and can be implemented in manual, autonomous, and semi-autonomous vehicle systems.

Generally, an emulation system according to the disclosed embodiments works in conjunction with the intent of the driver (human or autonomous) by: 1) receiving contextual parameters and real-time driver input commands, 2) simulating a vehicle executing the driver input commands within an environment defined in part by the contextual parameters, 3) determining one or more vehicle states as an output of the simulation, and 4) actuating one or more vehicle systems to place the vehicle in an equivalent state.

The contextual parameters can define one or more aspects of an environment or the vehicle itself. For example, a first contextual parameter can define a coefficient of friction between the vehicle tires and the ground surface of the environment. While a coefficient of friction parameter may be precisely defined, in one or more embodiments an interface can provide the driver with user-friendly options to select a coefficient of friction. Example user-friendly options may include "gravel skidpad," "wet pavement," "icy highway," "beach," "oil spill," etc., where the options each have one or more associated predefined contextual parameters.

The contextual parameters can also define one or more aspects of a vehicle that the driver desires to emulate. For example, contextual parameters related to the vehicle can define a vehicle size, a vehicle type, an engine type, a tire type, a front-to-rear weight ratio, a horsepower, etc.

The real-time driver inputs can include any inputs related to controlling and/or driving the vehicle, such as steering, throttle, brake, drive mode (e.g., normal mode, sports mode, etc.), suspension, etc.

The emulation system can include a simulator that can model a vehicle operating according to the driver input commands in an environment defined at least in part by the contextual parameters. For example, when a user selects "icy highway" as a contextual parameter, the simulator models a vehicle driving in a surface that has a relatively low coefficient of friction between the surface and the vehicle tires. The simulated vehicle in the simulated environment executes operational commands based on the driver input command, resulting in one or more output states for the vehicle. In one or more embodiments, the one or more output states include a set of output states for the vehicle body and for each wheel of the vehicle. The set of output states for the vehicle body can include velocity, sideslip angle, yaw rate, and the like. The set of output states for each wheel can indicate aspects and/or conditions of the wheel, including steering angle, wheel angular velocity, torque, and the like. Accordingly, the simulator can output a plurality of states that indicate one or more of position, trajectory, velocity, acceleration, lateral acceleration, sideslip angle, and yaw rate of the vehicle.

Based on the output states, the disclosed emulation system can actuate one or more vehicle systems to place the vehicle in an equivalent state. As discussed below, in one or more embodiments the emulation system can actuate controls on each wheel on an individual basis. For example, the emulation system can determine at least wheel angle commands and torque commands for each wheel of the vehicle to cause the vehicle to emulate one or more of the simulated states. That is, for example, by using rear wheel steering commands and torque commands the emulation system can cause the vehicle to rotate at a yaw rate and to travel on a curved trajectory equivalent to the output states yaw rate and trajectory indicated by the simulated output states.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any form of powered, multi-wheeled transport or vehicle that, for example, may be used to drift or experiment with drifting effects and thus can benefit from the functionality discussed herein.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-7 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes an emulation system 170 that functions to actuate individual wheel controls of a vehicle to emulate drifting according to driver input and contextual parameters. Moreover, while depicted as a stand-alone component, in one or more embodiments, the emulation system 170 can be integrated with another component of the vehicle 100, such as the autonomous driving module 160 or other drive control system of the vehicle 100. The noted functions and methods will become more apparent in the following discussion of the figures.

Figure 2:
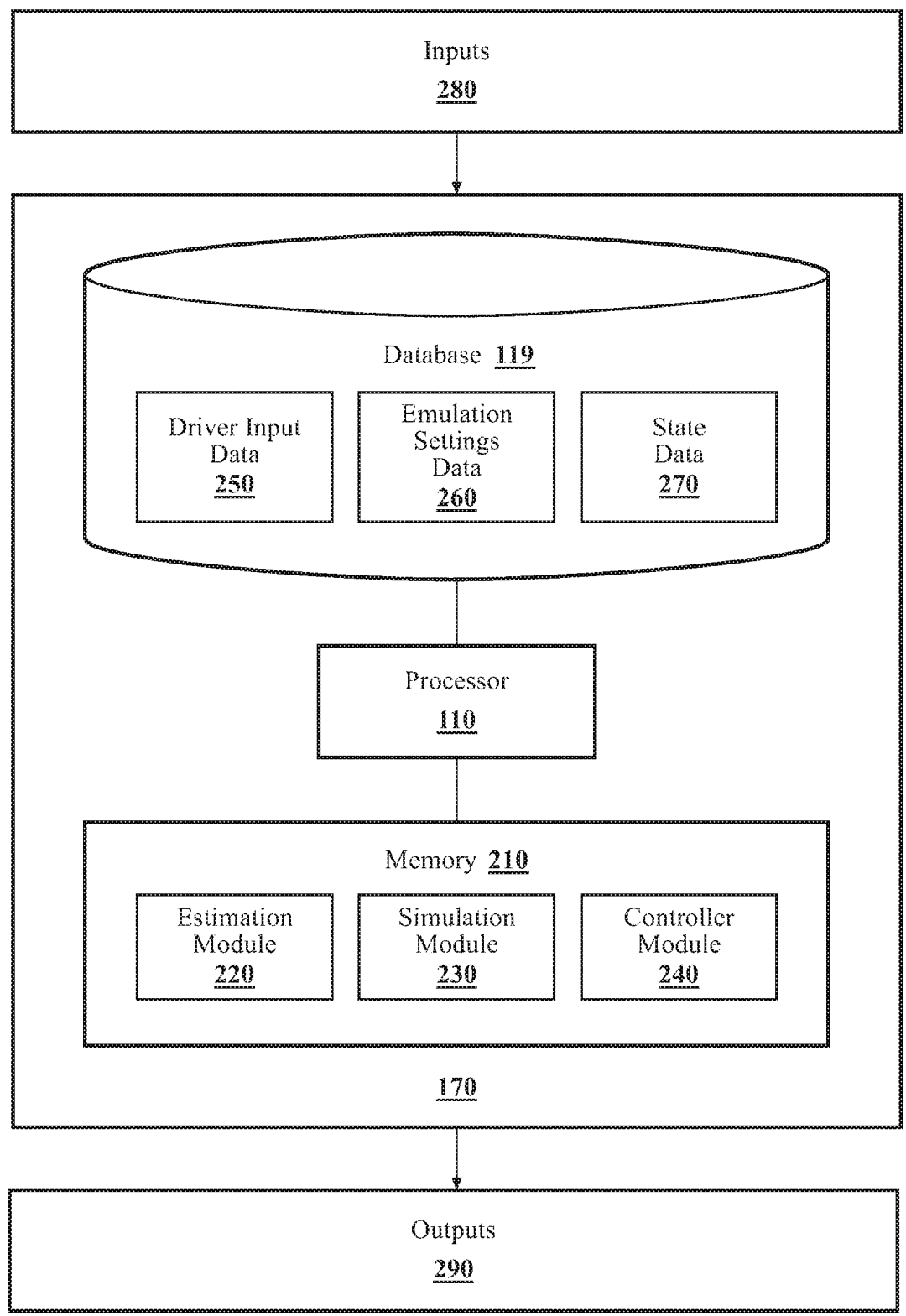
FIG. 2 illustrates one embodiment of an emulation system according to the disclosed embodiments.

With reference to FIG. 2, one embodiment of a vehicular implementation of the emulation system 170 of FIG. 1 is illustrated. The emulation system 170 is shown as including a processor 110 and database 119 from the vehicle 100 of FIG. 1. Accordingly, the processor 110 may be a part of the emulation system 170, the emulation system 170 may include a processor separate from the processor 110 of the vehicle 100 or the emulation system 170 may access the processor 110 through a data bus or another communication path.

The emulation system 170 includes a database 119 that stores, among other things, input data 250 (e.g., driver command inputs), emulation settings data 260 (e.g., contextual parameters) and state data 270 (e.g., measured vehicle states), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

Additionally, the emulation system 170, in one or more embodiments, includes a memory 210 that stores an estimation module 220, a simulation module 230, and a controller module 240. The memory 210 can be constructed as a random-access memory (RAM), read-only memory (ROM), a hard-disk drive, a flash memory, or other suitable memory for storing the modules 220, 230, and 240. The modules 220, 230, and 240 are, for example, constructed as computer-readable instructions that when executed by the processor 110 cause the processor 110 to perform the various functions disclosed herein.

The emulation system 170 can receive various inputs 280 and process and/or store the inputs 280, for example, as driver input data 250, emulation settings data 260, and state data 270. The driver input data 250 can include, for example, driver inputs such as steering wheel angle, brake pedal position, throttle pedal position, handbrake level position, etc. The emulation settings data 260 can include, for example, contextual parameters that indicate environmental aspects or vehicular aspects. The state data 270 can include, for example, measured states of the vehicle 100 such as velocity, wheel speed, GPS location, trajectory, etc., obtained from various vehicle systems 140 (FIG. 1)

The estimation module 220 is generally constructed including instructions that function to control the processor 110 to determine a capability estimate that indicates one or more estimated maximum achievable states for the vehicle 100 based on the state data 270.

The driver input data 250 and emulation settings data 260 are provided as inputs to the simulation module 230. The simulation module 230 is generally constructed including instructions that function to control the processor 110 to execute a simulated model that receives the driver input data 250 and emulation settings data 260 that indicate one or more environment parameters and/or vehicle parameters, simulate the vehicle operating based on the driver input data 250 and the emulation settings data 260, and output one or more simulated states of the vehicle 100 based on the simulated operation. In one or more embodiments, the simulation module 230 can further receive the capability estimate from the estimation module 220 as input to the simulation operation to define operational boundaries of the simulation operation.

The controller module 240 is generally constructed including instructions that function to control the processor 110 to determine at least wheel angle commands and torque commands for each wheel of the vehicle 100 to cause the vehicle to emulate the one or more simulated states. In one or more embodiments, the controller module 240 can be implemented as a closed-loop controller that receives the simulated states and state data 270 (i.e., actual measured states of the vehicle 100) as inputs to determine the wheel angle commands and torque commands required to achieve the simulated states. In one or more embodiments, the controller module 240 further includes instructions to determine braking commands and suspension commands for each wheel of the vehicle to cause the vehicle 100 to emulate the one or more simulated states.

Figure 3:
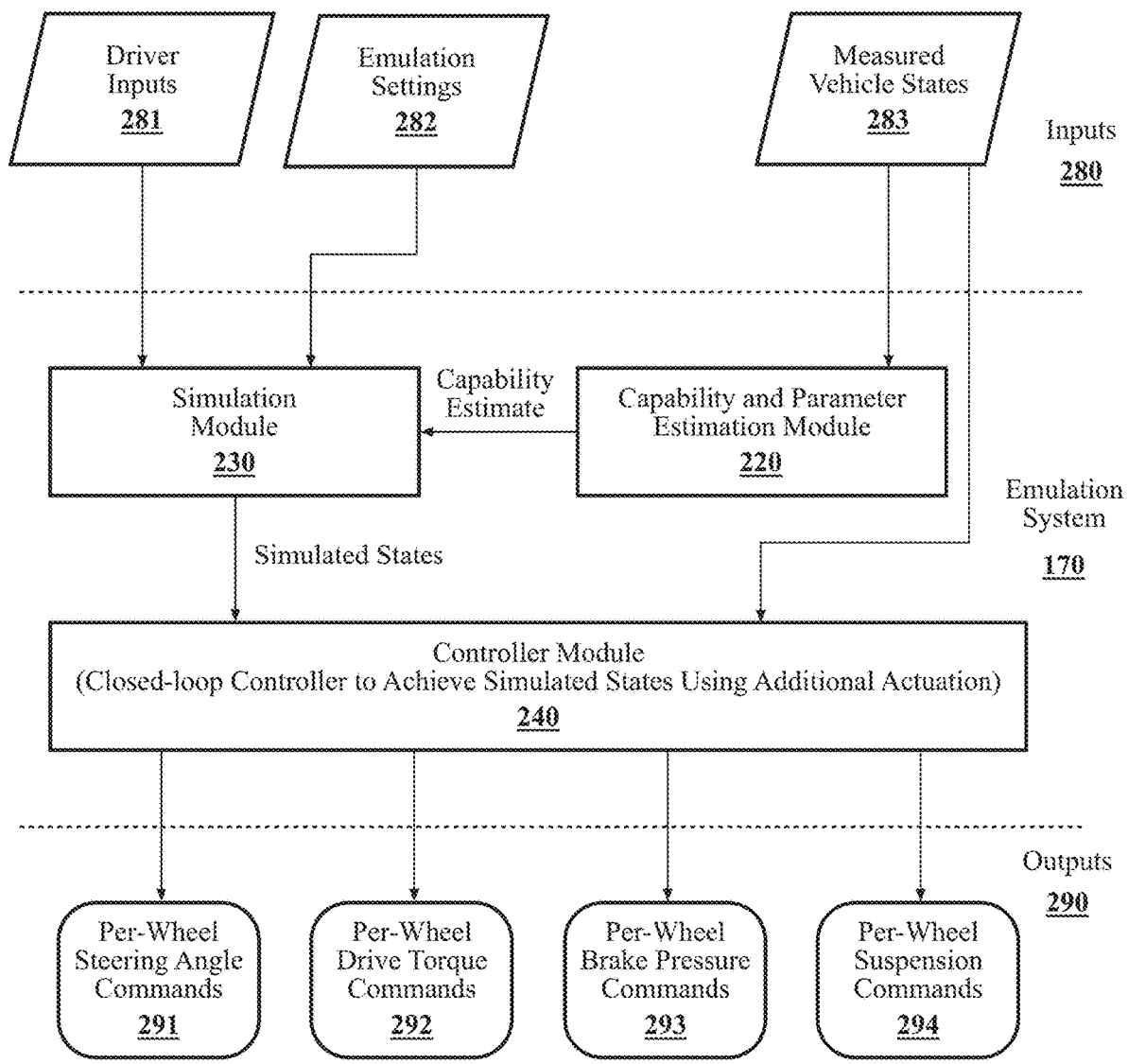
FIG. 3 illustrates an example flowchart of inputs and outputs for an embodiment of the emulation system according to the disclosed embodiments.

FIG. 3 illustrates an example flowchart 300 of inputs 280 and outputs 290 for an embodiment of the emulation system 170. The inputs 280 include driver inputs 281, emulation settings 282, and measured vehicle state 283. The inputs 280 may be received from various vehicle systems 140 as described above and stored in the database 119 as well as passed directly to any module that needs to process the input 280, as described below.

In one or more embodiments, the estimation module 220 can receive measured state values 283, such as wheel speed, vehicle velocity, inertial measurement unit (IMU) output, etc., and determine a capability estimate that indicates one or more maximum achievable vehicle states. For example, in one implementation a capability estimate combines tire parameters (e.g., road-tire friction, road-tire cornering stiffness) estimated from sensor measurements with physical vehicle parameters (e.g., maximum steering angle, mass, length) and transforms them into maximum achievable states. For example, the maximum steady state yaw rate $r_{ss}$ is given by:

$$r_{ss} = \frac{(\mu_{estimate})9.81}{velocity} \qquad \text{(Eq. 1)}$$

where velocity is measured by the vehicle sensors. The steady state yaw rate indicates the relationship between yaw rate and velocity that the vehicle can achieve, and when emulating a drift or other scenario the vehicle should not exceed this value. Another example capability estimate would be an estimate of the relationship between maximum/minimum sideslip and yaw rate, which depends on velocity and the maximum front and rear steering angles as well as front and rear friction values. The estimation module 220 can output the capability estimate to the simulation module 230.

In one or more embodiments, the simulation module 230 can implement a simulated model (e.g., a driving simulation) that receives the driver inputs 281 and emulation settings 282 as inputs. The simulated model can simulate operation of the vehicle 100 in response to the driver inputs 250 and the emulation settings data 260 (i.e., the contextual environmental and/or vehicular parameters). In one or more embodiments, the simulated model can receive the capability estimate as an input to define operational boundaries of the driving simulation. Based at least in part on the driving simulation, the simulation module 230 outputs one or more simulated states that indicate one or more states or aspects of the vehicle 100 (e.g., velocity, yaw rate, sideslip, etc.) and/or one or more states or aspects of components of the vehicle 100 (e.g., wheels). The simulated states estimate vehicular states that the simulation indicates would exist if the vehicle 100 were executing commands based on the driver inputs 281 under conditions indicated by the emulation settings 282.

The controller module 240 can receive the simulated states and measured vehicle states 283 as inputs and determine one or more per-wheel commands as outputs 290. In one or more embodiments, the controller module 240 can be implemented as a closed-loop controller configured to modulate actuation of vehicle 100 components to achieve one or more of the simulated states. The controller module 240 can determine, in real-time, actuation commands per wheel to achieve the simulated states. Such per-wheel commands can include per-wheel steering angle commands 291, per-wheel drive torque commands 292, per-wheel brake pressure commands 293 and per-wheel suspension commands 294.

Figure 4:
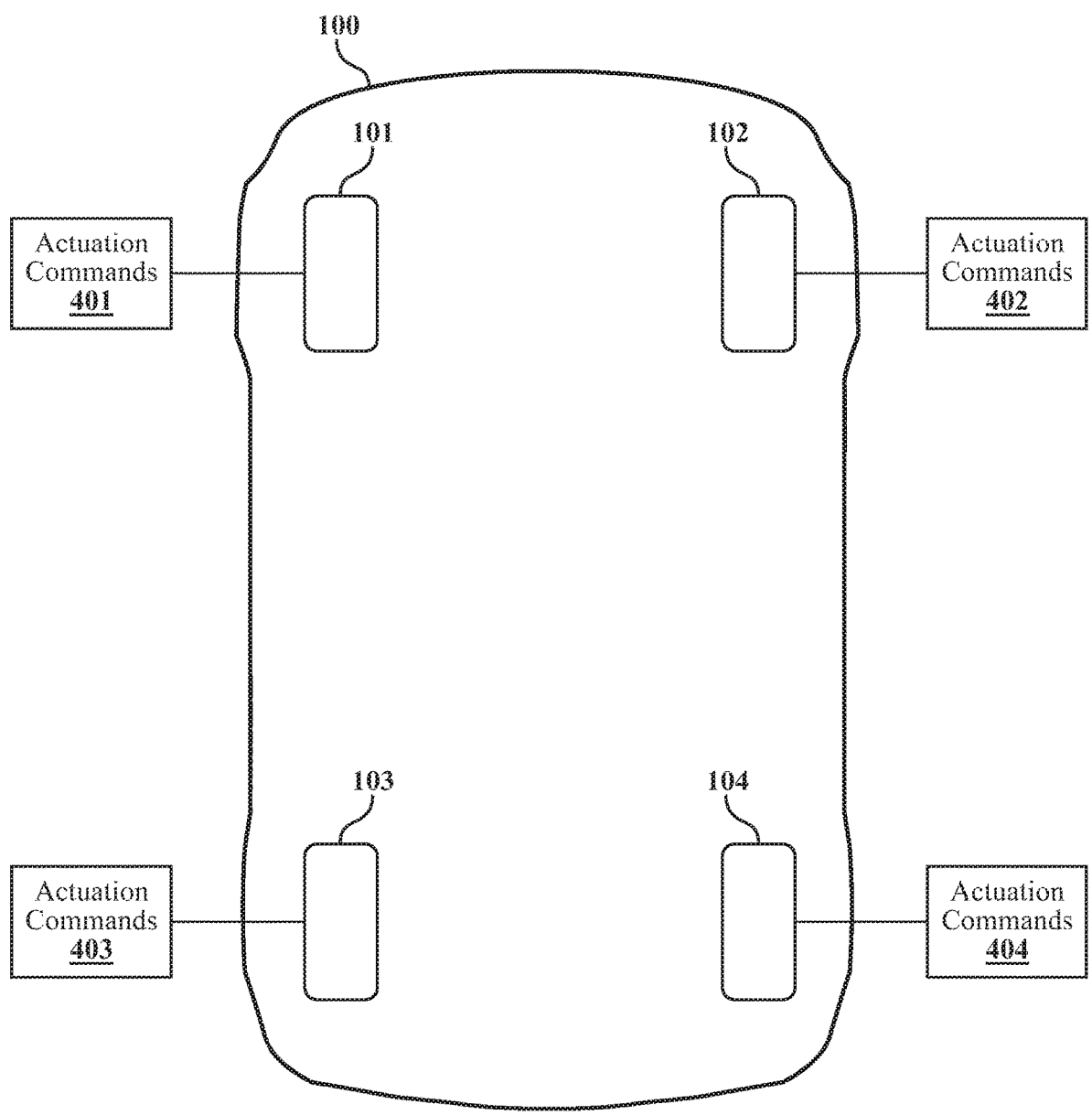
FIG. 4 illustrates an example top view of a vehicle having four wheels, each capable of receiving independent actuation commands according to the disclosed embodiments.

FIG. 4 illustrates an example top view of the vehicle 100 having four wheels 101-104, each capable of receiving independent actuation commands 401-404 from the disclosed emulation system 170. Thus, the emulation system 170 can apply distinct commands to each wheel 101-104.

Figure 5:
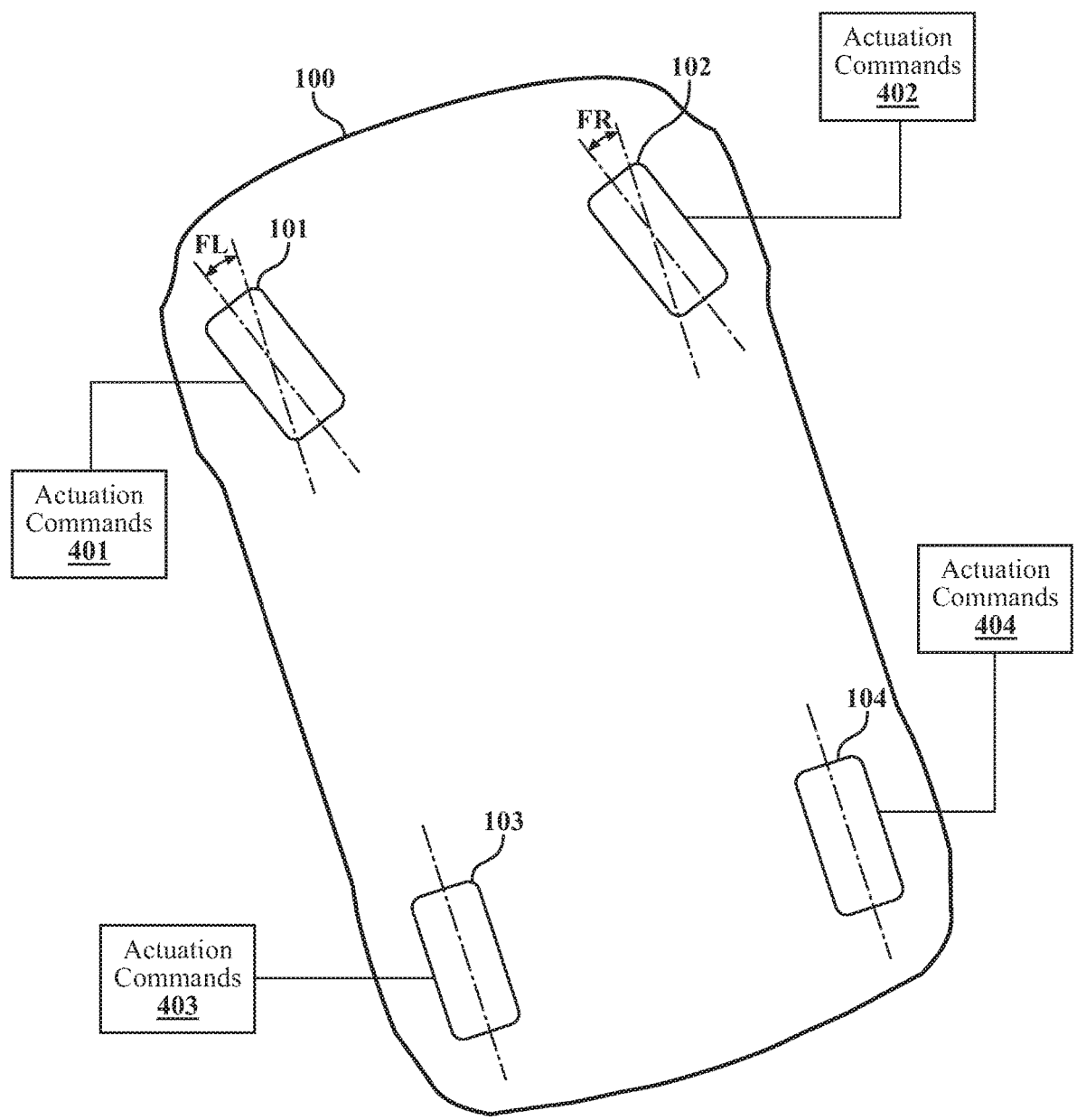
FIG. 5 illustrates an example top view of a vehicle in an example scenario initiating a turn, according the disclosed embodiments.
Figure 6:
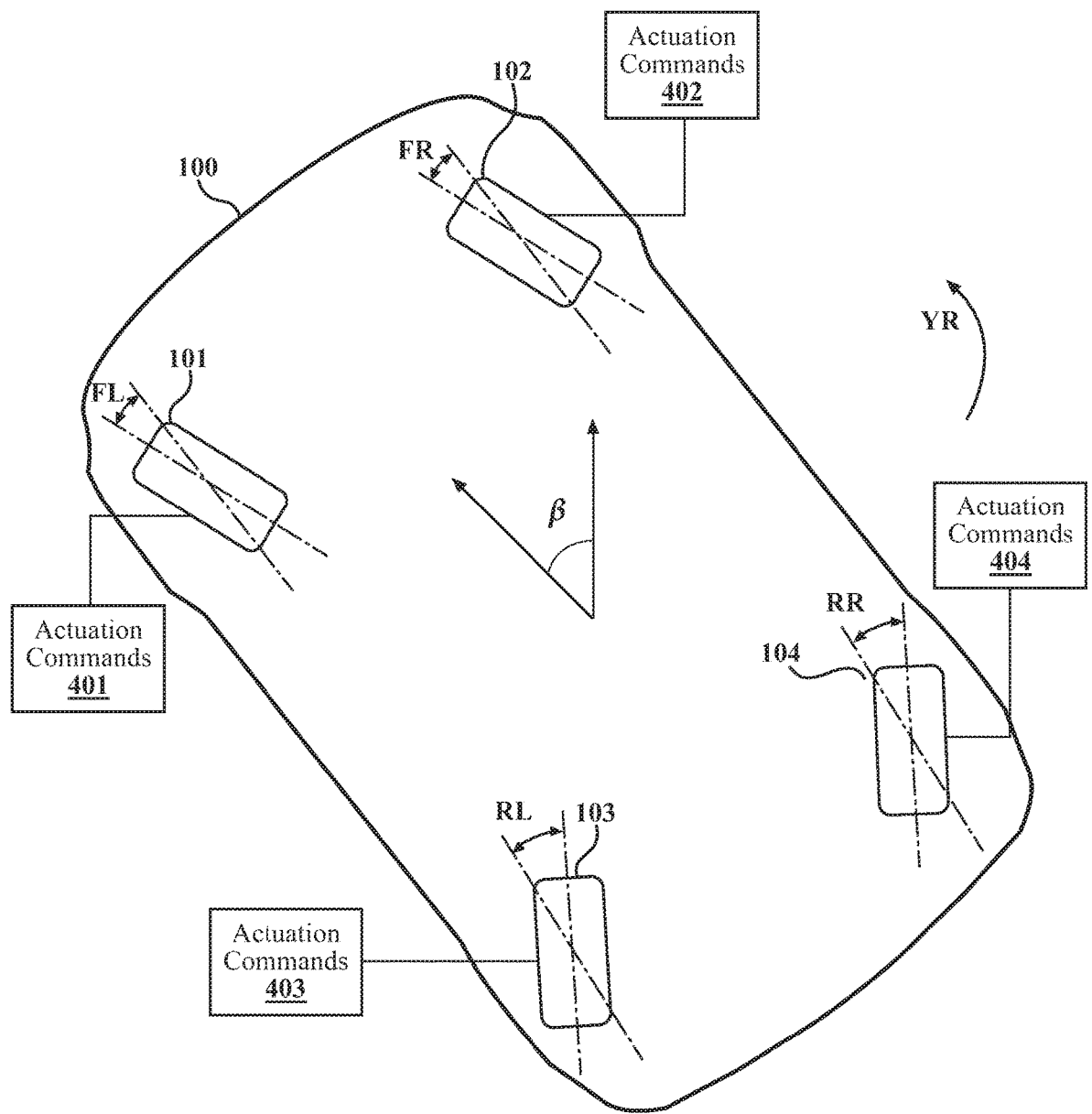
FIG. 6 illustrates another example top view of a vehicle in the example scenario initiating a drift, according the disclosed embodiments.

FIGS. 5 and 6 illustrate top views of the vehicle 100 in an example scenario of the disclosed emulation system 170 processing driver inputs to emulate a drift. First, referring to FIGS. 3 and 5, a driver of vehicle 100 enters emulation settings 282. In this example scenario the emulation settings 282 include contextual parameters of a "gravel skidpad" (which the emulation system 170 may translate, for example, via a lookup table, to a coefficient of friction of 0.55) and vehicular parameters based on a Toyota MR2 Turbo, e.g., weight distribution: 43% Front/57% Rear. The emulation system 170 receives and stores the emulation settings 282 as emulation settings data 260 (FIG. 2).

Next, the driver drives the vehicle 100 and is ready to drift. The driver applies the throttle and, after attaining a speed of 30 mph, turns the steering wheel 35 degrees to initiate a turn.

In response, the emulation system 170 (e.g., simulation module 230) receives as input the emulation settings 282 and the driver input 281 and runs a driving simulation based on the input. That is, the simulation module 230 executes a driving simulation of: 1) a simulated vehicle having parameters that at least include the vehicular parameters of the emulation settings 282, in this case, a 43% Front/57% Rear weight distribution, 2) a simulated environment having parameters that at least include the contextual parameters of the emulation settings data 260, in this case, a wheel-surface coefficient of friction of 0.55, and 3) the simulated vehicle executing the driver commands, in this case, throttle to 30 mph with a 35-degree steering wheel angle, in the simulated environment. In one or more embodiments, the emulation system 170 can include a plurality of default vehicular and contextual parameters as needed for input to the driving simulation to complete the simulated vehicle and/or the simulated environment.

The simulation module 230 can output one or more states of the simulated vehicle, such as velocity, yaw rate, sideslip, etc. For example, based on the simulated vehicle parameters, simulated environment parameters, and driver commands discussed above, the simulation module 230 may output the simulated vehicle accelerating to 30 mph, entering a 35-degree turn, a yaw rate of 5 degrees per second, and experiencing negligible sideslip.

The controller module 240 receives the simulated states and the actual measured states of the vehicle 100 as inputs and translates the simulated states into per-wheel actuation commands 401-404. In one or more embodiments, the controller module 240 utilizes a closed-loop controller to accomplish the task of placing the vehicle 100 in actual states that are at least approximately equivalent to the simulated states, with the goal being to mimic the simulated states as closely as possible. For example, referring to FIG. 5, the controller module 240 can determine one or more actuation commands 401-404 to achieve the simulated states, such as increase the torque of rear wheels 103 and 104, and turn the front left wheel 101 FL degrees and the front right wheel 102 FR degrees while leaving the rear wheels 103 and 104 straight. The result of the actuation commands is to cause the actual vehicle 100 to accelerate to 30 mph and enter a 35-degree turn with a yaw rate of 0.5 degrees per second. The results should match driver expectations in accordance with the driver inputs 281.

In one or more embodiments, the controller module 240, as a closed-loop controller, can constantly check what effect the drive commands are having on the actual state (e.g., velocity, yaw rate, torque, etc.) of the vehicle 100 and make any adjustment to the drive commands necessary to bring an actual state value closer to a simulated state value.

Continuing the example scenario, to initiate drifting, the driver increases the throttle and maintains the steering angle to induce an oversteer. The emulation system 170 continually receives driver inputs 281 in real time and therefore receives the throttle increase as driver input 281. The simulation module 230 continually inputs the driver input 281 into the driving simulation. In response to the throttle increase, the simulation module 230 outputs new states for the vehicle 100 based on the driving simulation results. For example, the driving simulation may indicate that the increased throttle from the drive input 281 causes the rear wheels 103, 104 to break friction, resulting in the simulated states of the yaw rate increasing to 30 degrees per second. Over the next second or so, this increased yaw rate in turn causes the simulated sideslip to increase to a large value of −30 degrees, and thus the simulated vehicle enters a drift situation.

The controller module 240 continually receives the simulated states and measured vehicle states 283 as input and continually determines per wheel actuation commands 401-404 to modulate that measured vehicle states 283 toward the simulated states. As shown in FIG. 6, the controller module 240 determines actuation commands 401 and 402 for front wheels 101 and 102, and actuation commands 403 and 404 for rear wheels 103 and 104, respectively.

For example, the actuation commands 401 includes a command to decrease torque for wheel 101 and maintain the wheel angle FL. The actuation commands 402 includes a command to decrease torque for wheel 102 and maintain the wheel angle FR. The actuation commands 403 includes a command to increase torque for wheel 103 and increase the wheel angle RL. The actuation commands 404 includes a command to increase torque for wheel 104 and increase the wheel angle RL.

As a result of the actuation commands 401-404, the vehicle 100 begins to emulate entering a drift with the rear of the vehicle 100 turning along an arc YR at a yaw rate of 30 degrees per second. Due to the torque adjustments and the angle of the rear wheels 103 and 104, the driver of vehicle 100 will feel the vehicle 100 turn and experience lateral force, rotational acceleration and sideslip at a slip angle β as though the vehicle 100 has entered a true drift, however, without the negative effects of a true drift. The wheels 101-104 maintain traction with the road surface and do not burn out, and the vehicle 100 is not at risk of spinning out.

In this manner the emulation system 170 may continue to process driver inputs 281, determine simulated states, and continue to determine actuator commands 401-404 to adjust states of the vehicle 100 to emulate the simulated states, thereby enabling the vehicle 100 to emulate drifting. In effect, the driver of vehicle 100 applies his or her intent to the simulated vehicle in the simulated environment and experiences the results in the actual vehicle 100. Accordingly, a driver of vehicle 100 can safely emulate different types of vehicles driving in different types of environments that may have otherwise been inaccessible or too dangerous to attempt. Additional and optional features of the emulation system 170 will be discussed below.

Figure 7:
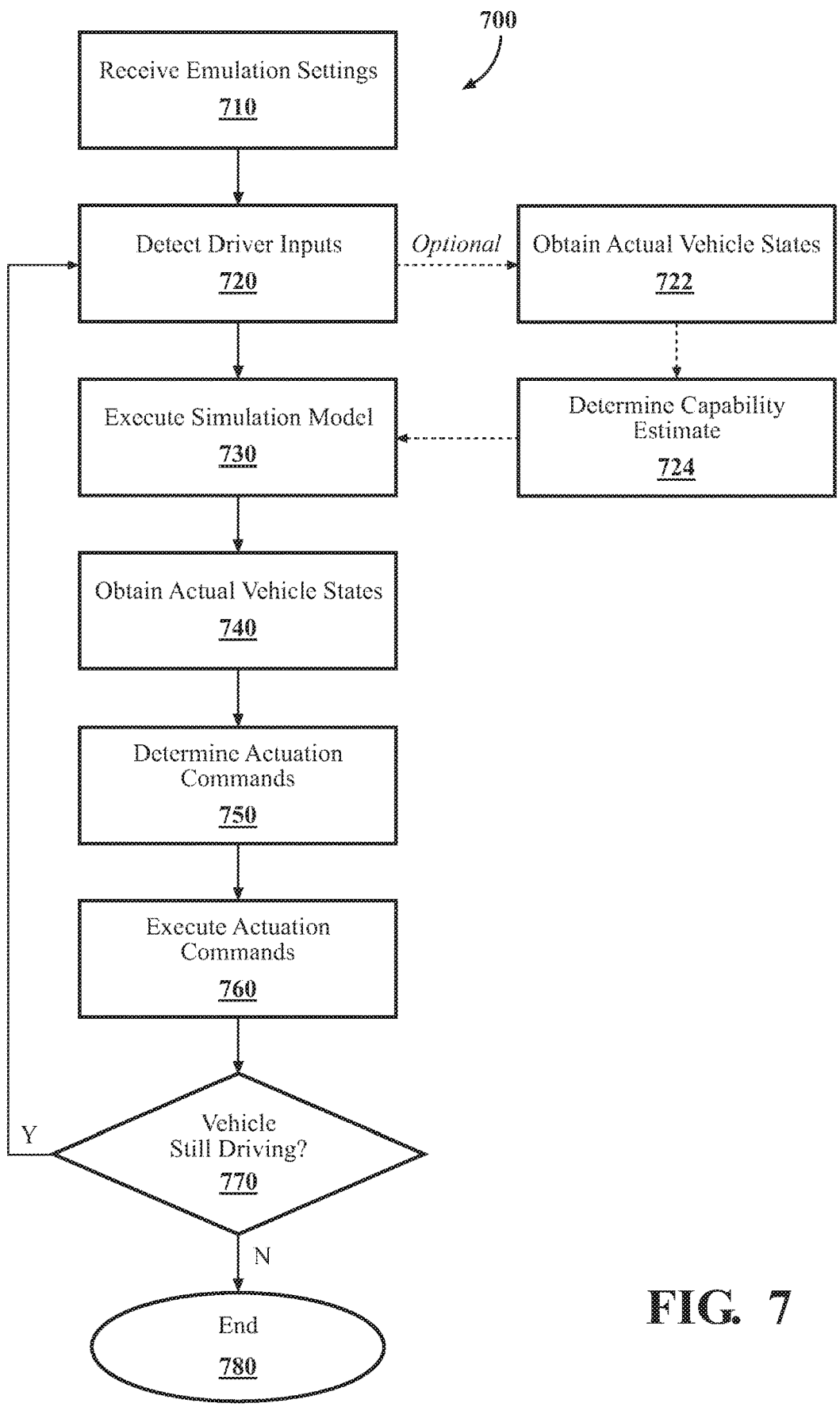
FIG. 7 illustrates an example flowchart of operations of an emulation system, according the disclosed embodiments.

FIG. 7 illustrates a flowchart of a method 700 of emulating vehicle maneuvers according to the disclosed embodiments. Method 700 will be discussed from the perspective of the emulation system 170 of FIGS. 1-3. While method 700 is discussed in combination with the emulation system 170, it should be appreciated that the method 700 is also not limited to being implemented within the emulation system 170 but is instead one example of a system that may implement the method 700.

At operation 710, the emulation system 170 receives emulation settings 282. In one or more embodiments, the emulation settings 282 indicate one or more environment parameters (e.g., ground surface type, weather, etc.) and/or vehicle parameters (e.g., vehicle make/model, weight distribution, size, engine type, wheel type, etc.). In one or more embodiments, the environment parameters indicate at least a coefficient of friction between a ground surface and the plurality of wheels. The driver, or other individual, can input the emulation settings 282, for example, via a user interface in the vehicle 100 or a network computing device communicatively connected to the vehicle 100.

At operation 720, the emulation system 170 detects driver inputs 281. For example, the driver may begin to drive the vehicle 100 and indicate intended driving commands by pressing the gas pedal, turning the steering wheel, pressing the brake pedal, etc. Such intended driving commands are received by the emulation system 170 as driver inputs 281. In one or more embodiments the driver inputs 281 can be stored in the database 119 as driver input data 250. The driver input data 250 can be timestamped and accessible to modules of the emulation system 170. In one or more embodiments, the driver inputs 281 can be directly fed to the emulation system 170 (e.g., to the simulation module 230).

At operation 722, as an optional feature in one or more embodiments, the emulation system 170, e.g., estimation module 220, can obtain one or more values of actual, measured states of the vehicle 100. For example, the actual states of the vehicle 100 can include one or more of a current velocity, a current GPS position, etc.

At operation 724 the estimation module 220 can determine, based at least in part on the one or more actual measured states of the vehicle 100, a capability estimate that indicates one or more estimated maximum achievable states for the vehicle 100.

At operation 730, the emulation system 170, e.g., simulation module 230, executes a driving simulation model that receives the driver inputs 281 and the emulation settings 282, simulates the vehicle 100 operating based on the driver inputs 281 and the emulation settings 282, and outputs one or more simulated states of the vehicle 100 based on the simulated operation of the vehicle 100. In one or more embodiments, the simulation module 230 can receive the capability estimate as an additional input to define operational boundaries of the simulated operation of the vehicle. For example, in one scenario the capability estimate can indicate an estimated maximum acceleration rate of the vehicle 100 and a maximum achievable turn radius. In this case, the simulation model will simulate driving within the bounds of the estimated maxima (or minima) indicated by the capability estimate. That is, no simulated state will fall outside of the bounds defined by the capability estimate.

At operation 740, the emulation system 170 can obtain one or more values of actual, measured states of the vehicle 100. For example, the actual states of the vehicle 100 can include one or more of a current velocity, a current GPS position, etc.

At operation 750, the emulation system 170, e.g., controller module 240, determines one or more actuation commands 401-404 for each wheel 101-104, respectively, to cause the vehicle 100 to emulate the one or more simulated states. In one or more embodiments, the controller module 240 is implemented as a closed-loop controller that receives the one or more simulated states and the actual states of the vehicle 100 as inputs to determine the wheel angle commands and torque commands required to achieve the simulated states. The wheel angle commands can include individual turn radii per wheel. The torque commands can include wheel speed commands.

In one or more embodiments, the controller module 240 determines braking commands and suspension commands for each wheel 101-104 of the vehicle 100 to cause the vehicle 100 to emulate the one or more simulated states. Accordingly, in one or more embodiments, the controller module 240 can determine one or more of wheel angle commands, torque commands, suspension commands and braking commands, in any combination, to cause the vehicle 100 to emulate the simulated states.

At operation 760, the emulation system 170 executes the actuation commands, i.e., controls each individual wheel 101-104 according to the actuation commands, thereby causing the vehicle 100 to achieve one or more states that are equivalent or approximately equivalent to the simulated states.

At operation 770, the emulation system 170 determines whether the vehicle 100 is still being driven. If the vehicle 100 is still being driven, the process continues to detect driver inputs 281 at operation 720 and continually loops to determine simulated states, actual states, and actuator commands, and continues to execute the actuator commands. In one or more embodiments, the emulation system 170 can continually execute operations 720-760. That is, once the emulation system 170 initiates the simulation, the emulation system 170 can continue to run the simulation model for the duration of the drive such that the simulation model is continually responding to driver inputs 281 and generating simulated states, and the controller module 240 is continually receiving actual vehicle states and determining actuation commands 401-404 to cause the vehicle 100 to emulate the simulated states. In one or more embodiments, the controller module 240 can determine actuation commands that are limited to thresholds that prevent loss of control of the vehicle 100.

At operation 770, when the emulation system 170 determines that the vehicle 100 is no longer driving, the process ends at operation 780.

Accordingly, the disclosed emulation system 170 can, through all-wheel actuation control, emulate various vehicle maneuvers of different vehicle types in different environments, including, for example, emulating vehicle drift. The disclosed emulation system 170 can allow a driver of a vehicle to safely emulate drifting while significantly reducing or eliminating risks of spin-out or wheel burn.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g, one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The input system 10 can receive, for example, input indicating or defining emulation settings 282 as discussed above.

The vehicle 100 can include an output system 135. An "output system" includes any device, component, or arrangement or groups thereof that enable information/data to be presented to a vehicle passenger (e.g., a person, a vehicle passenger, etc.). The output system 135 can function as part of an interface that can present, for example, current emulation settings 282 or options to enter or adjust emulation settings 282.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can by operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the emulation system 170, and/or the autonomous driving module(s) 160 can be operatively connected to communicate with the various vehicle systems 140 and/or individual components thereof. For example, returning to FIG. 1, the processor(s) 110, the emulation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the emulation system 170, and/or the autonomous driving module(s) 160 may control some or all of these vehicle systems 140 and, thus, may be partially or fully autonomous.

The processor(s) 110, the emulation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110, the emulation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities. The emulation system 170 can determine one or more actuation commands for one or more of the actuators 150 on a per wheel basis, as discussed above.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the emulation system 170 can be configured to determine travel path(s) and determine current autonomous driving maneuvers for the vehicle 100, future autonomous driving maneuvers and/or modifications to current autonomous driving maneuvers based on data acquired by the sensor system 120 and/or emulation system 170, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An emulation system for emulating vehicle dynamics in a vehicle having a plurality of wheels and equipped with all-wheel steering, comprising:
   one or more processors; and
   a memory, communicably connected to the one or more processors, storing:
      an estimation module including instructions that when executed by the one or more processors cause the one or more processors to receive vehicle state data and to determine a capability estimate that indicates one or more estimated maximum achievable states for the vehicle;
      a simulation module including instructions that when executed by the one or more processors cause the one or more processors to execute a simulated model that receives the capability estimate to define operational boundaries of a simulated operation of the vehicle, driver inputs, detected by one or more sensors and including at least a steering input and a throttle input, and emulation settings that indicate one or more vehicle parameters, simulate the vehicle operating based on the driver inputs and the emulation settings, and output one or more simulated states of the vehicle based on the simulated operation of the vehicle; and
      a controller module including instructions that when executed by the one or more processors cause the one or more processors to determine actuation commands for each wheel of the vehicle to cause the vehicle to emulate the one or more simulated states, wherein the actuation commands include at least wheel angle commands and torque commands,
   wherein:
      the one or more estimated maximum achievable states include at least one of a maximum steady state yaw rate or a maximum turn radius, and
      the operational boundaries are with respect to at least one of a relationship between yaw rate and velocity or a relationship between sideslip and yaw rate.

2. The emulation system of claim 1, wherein the controller module is implemented as a closed-loop controller configured to receive the one or more simulated states and the vehicle state data that indicate one or more actual measured states of the vehicle as inputs to determine the wheel angle commands and the torque commands required to achieve the one or more simulated states.

3. The emulation system of claim 1, wherein the vehicle parameters indicate at least one of a type of engine, a vehicle size, a vehicle weight distribution, or a type of tire.

4. The emulation system of claim 1, wherein the emulation system further indicates environment parameters that indicate one or more of:
   a ground surface type, or
   a weather condition,
   wherein the environment parameters indicate at least a coefficient of friction between a ground surface and the plurality of wheels.

5. The emulation system of claim 1, wherein the one or more simulated states indicate one or more of:
   a velocity of the vehicle, or
   a yaw rate of the vehicle.

6. The emulation system of claim 1, wherein the controller module further includes instructions to determine suspension commands for each wheel of the vehicle to cause the vehicle to emulate the one or more simulated states.

7. A method for emulating vehicle dynamics in a vehicle having a plurality of wheels and equipped with all-wheel steering, comprising:
   determining, based at least in part on one or more actual measured states of the vehicle, a capability estimate that indicates one or more estimated maximum achievable states for the vehicle;
   receiving emulation settings that indicate one or more vehicle parameters;
   receiving driver inputs, detected by one or more sensors, including at least a steering input and a throttle input;
   executing a simulation model that receives the capability estimate to define operational boundaries of a simulated operation of the vehicle, the driver inputs, and the emulation settings, simulates the vehicle operating based on the driver inputs and the emulation settings, and outputs one or more simulated states of the vehicle based on the simulated operation of the vehicle;
   determining one or more actuation commands for each wheel of the vehicle to cause the vehicle to emulate the one or more simulated states; and
   executing the one or more actuation commands, wherein the one or more actuation commands include at least wheel angle commands and torque commands,
wherein:
the one or more estimated maximum achievable states include at least one of a maximum steady state yaw rate or a maximum turn radius, and
the operational boundaries are with respect to at least one of a relationship between yaw rate and velocity or a relationship between sideslip and yaw rate.

8. The method of claim 7, further comprising determining the one or more actuation commands by utilizing a closed-loop controller configured to receive the one or more simulated states and the vehicle state data that indicate the one or more actual measured states of the vehicle as inputs to determine the wheel angle commands and the torque commands required to achieve the one or more simulated states.

9. The method of claim 7, wherein the vehicle parameters indicate at least one of a type of engine, a vehicle size, a vehicle weight distribution, or a type of tire.

10. The method of claim 7, wherein the emulation system further indicates environment parameters that indicate one or more of:
a ground surface type, or
a weather condition,
wherein the environment parameters indicate at least a coefficient of friction between a ground surface and the plurality of wheels.

11. The method of claim 7, wherein the one or more simulated states indicate one or more of:
a velocity of the vehicle, or
a yaw rate of the vehicle.

12. The method of claim 7, further comprising determining suspension commands for each wheel of the vehicle to cause the vehicle to emulate the one or more simulated states.

13. A non-transitory computer-readable medium for emulating vehicle dynamics in a vehicle having a plurality of wheels and equipped with all-wheel steering, including instructions that, when executed by one or more processors, cause the one or more processors to:
determine, based at least in part on one or more actual measured states of the vehicle, a capability estimate that indicates one or more estimated maximum achievable states for the vehicle;
receive emulation settings that indicate one or more vehicle parameters;
receive driver inputs, detected by one or more sensors, including at least a steering input and a throttle input;
execute a simulation model that receives the capability estimate to define operational boundaries of a simulated operation of the vehicle, the driver inputs and the emulation settings, simulates the vehicle operating based on the driver inputs and the emulation settings, and outputs one or more simulated states of the vehicle based on the simulated operation of the vehicle;
determine one or more actuation commands for each wheel of the vehicle to cause the vehicle to emulate the one or more simulated states; and
execute the one or more actuation commands,
wherein the one or more actuation commands include wheel angle commands and torque commands,
wherein:
the one or more estimated maximum achievable states include at least one of a maximum steady state yaw rate or a maximum turn radius, and
the operational boundaries are with respect to at least one of a relationship between yaw rate and velocity or a relationship between sideslip and yaw rate.

14. The non-transitory computer-readable medium of claim 13, further comprising instructions to determine the one or more actuation commands by utilizing a closed-loop controller configured to receive the one or more simulated states and the vehicle state data that indicate the one or more actual measured states of the vehicle as inputs to determine the wheel angle commands and the torque commands required to achieve the one or more simulated states.

15. The non-transitory computer-readable medium of claim 13, wherein the emulation system further indicates environment parameters that indicate one or more of:
a ground surface type, or
a weather condition,
wherein the environment parameters indicate at least a coefficient of friction between a ground surface and the plurality of wheels.

16. The non-transitory computer-readable medium of claim 13, wherein the one or more simulated states indicate one or more of:
a velocity of the vehicle, or
a yaw rate of the vehicle.

17. The non-transitory computer-readable medium of claim 13, further comprising instructions to determine suspension commands for each wheel of the vehicle to cause the vehicle to emulate the one or more simulated states.

18. A system, comprising:
a processor; and
a memory storing a module including instructions that cause the processor to:
determine, based on vehicle state data, a capability estimate that indicates an estimated maximum achievable state for the vehicle;
determine, based on the capability estimate, to define an operational boundary of a simulated operation of the vehicle, and an emulation setting that indicates a vehicle parameter, the simulated state of a vehicle, and
determine, based on the simulated state, wheel commands and torque commands,
wherein:
the estimated maximum achievable state includes at least one of a maximum steady state yaw rate or a maximum turn radius, and
the operational boundary is with respect to at least one of a relationship between yaw rate and velocity or a relationship between sideslip and yaw rate.

* * * * *